US010435768B1

(12) United States Patent
Schwenk

(10) Patent No.: US 10,435,768 B1
(45) Date of Patent: Oct. 8, 2019

(54) METHOD OF RECOVERING MATERIALS BOUND TO A METALLIC SUBSTRATE USING CRYOGENIC COOLING

(71) Applicant: PGM RECOVERY SYSTEMS, INC., Winchester, CA (US)

(72) Inventor: Edmund Schwenk, Winchester, CA (US)

(73) Assignee: PGM RECOVERY SYSTEMS, INC., Winchester, CA (US)

( * ) Notice: Subject to any disclaimer, the term of this patent is extended or adjusted under 35 U.S.C. 154(b) by 0 days.

(21) Appl. No.: 16/200,448

(22) Filed: Nov. 26, 2018

(51) Int. Cl.
*C22B 3/00* (2006.01)
*C22B 7/00* (2006.01)

(52) U.S. Cl.
CPC ............ *C22B 11/046* (2013.01); *C22B 7/001* (2013.01); *C22B 7/004* (2013.01); *C22B 7/005* (2013.01); *C22B 7/006* (2013.01)

(58) Field of Classification Search
CPC ......... C22B 7/001; C22B 7/004; C22B 7/005; C22B 11/0021; C22B 11/0025; C22B 11/0042; C22B 11/0046; C22B 11/0048; Y02P 10/238
See application file for complete search history.

(56) References Cited

U.S. PATENT DOCUMENTS

| | | | | |
|---|---|---|---|---|
| 3,885,744 A * | 5/1975 | Drage | B02C 23/14 241/23 |
| 5,279,464 A * | 1/1994 | Giegerich | B01J 23/96 241/19 |
| 2003/0121366 A1* | 7/2003 | Tateiwa | C22B 7/005 75/401 |
| 2004/0156764 A1* | 8/2004 | Soe | C22B 7/009 423/22 |

(Continued)

FOREIGN PATENT DOCUMENTS

| | | | |
|---|---|---|---|
| JP | 04-99826 | * | 3/1992 |
| WO | WO 2004067172 A1 | * | 8/2004 |

OTHER PUBLICATIONS

JP 04-99826 machine translation of the description (Year: 1992).*

(Continued)

*Primary Examiner* — Tima M. McGuthry-Banks
(74) *Attorney, Agent, or Firm* — Arc IP Law, PC; Joseph J. Mayo

(57) ABSTRACT

A recycling process that facilitates separation of materials from metallic substrates by cryogenically cooling the recyclable items to induce embrittlement of the metals. Embrittled metals may be shattered more efficiently and with a higher yield of materials bound to the metallic substrates. Metal embrittlement may be induced by mixing the source stream with liquid nitrogen, and cooling the stream to approximately minus 200° F. Multiple recovery (Continued)

stages may be employed to maximize the yield of the target materials. Embodiments may enable recovery of platinum group metals (PGMs) from catalytic converters with metallic foil substrates. Yield of PGMs may be enhanced by employing a primary recovery stage and a secondary recovery stage, by cryogenically cooling input materials for each stage, by mixing the pulverized material in secondary recovery with an aqueous solution to dissipate attractive charges, and by wet screening the pulverized material slurry to obtain the PGM particles.

21 Claims, 8 Drawing Sheets

(56) References Cited

U.S. PATENT DOCUMENTS

2011/0127201 A1* 6/2011 Domke ..................... B03C 1/01
209/8

OTHER PUBLICATIONS

Schwartz, Harold. "Elements: Rhodium, Platinum, Palladium." ProKon Version 8.6. The Calculation Companion (Year: 1998).*
JP H0499826 A human translation (Year: 1992).*
Hensel, et al., "Recycling Technology for Metallic Substrates: a Closed Cycle", Society of Automotive Engineers, Inc., 2000, 5 pages.

* cited by examiner

METHOD OF RECOVERING MATERIALS BOUND TO A METALLIC SUBSTRATE USING CRYOGENIC COOLING

BACKGROUND OF THE INVENTION

Field of the Invention

One or more embodiments of the invention are related to the field of metal recycling. More particularly, but not by way of limitation, one or more embodiments of the invention enable a method of recovering materials bound to a metallic substrate using cryogenic cooling.

Description of the Related Art

Recycling of industrial or consumer products generally involves separating the recyclable items into their constituent materials. Materials bound to a metallic substrate are often difficult to recover economically. A particular challenge is recovery of platinum group metals ("PGMs") from catalytic converters. Because PGMs are extremely expensive, recovering a large fraction of the PGMs from a recycled catalytic converter is highly valuable.

Existing processes to recover PGMs from catalytic converters with metallic foil substrates generally recover only about 80% to 90% of the PGMs bound to the metallic substrate. The remaining unrecovered PGMs are lost as waste when the fragments of the metallic substrate are recycled as scrap metal. For example, existing processes may leave approximately 5 ounces of unrecovered palladium per ton of metallic substrate. Although this amount is tiny as a percentage of material, the high price of palladium (currently approximately $1,100 per oz.) implies that $5,500 of palladium is discarded per ton of recycled substrate. Existing processes are not able to capture this value.

Existing PGM recovery processes generally use very powerful equipment to mechanically crush and grind metallic substrates into small particles. This equipment increases the cost of recovery operations due to high energy use, high capital costs, and high equipment maintenance costs.

Some existing PGM recovery processes also generate environmentally toxic iron oxide metal sludges as waste. These sludges typically go into landfills, which creates a potential liability for the recycler due to environmental contamination. The recycler also may have to pay to dispose of the waste, which further increases the cost of the recycling operation.

These three issues with existing recovery processes—incomplete recovery, expensive heavy-duty equipment, and environmentally toxic waste—may be addressed with a recovery process that uses cryogenic cooling. Metals can be cryogenically cooled to very low temperatures inexpensively, for example using liquid nitrogen. In recycling, cryogenically cooled metals can be shattered more efficiently and effectively, using lower power equipment. In addition, use of cryogenic cooling increases the yield of PGMs from metallic substrates. Yields can be further enhanced by using two separate recovery stages, and by performing separation in water rather than in air. Cryogenic cooling, two-stage recovery, and water separation have not been applied in recovery of materials from metallic substrates. A recovery process that uses cryogenic cooling is also a clean process that does not generate toxic waste, since both PGMs and metallic substrates can be recycled.

For at least the limitations described above there is a need for a method of recovering materials bound to a metallic substrate using cryogenic cooling.

BRIEF SUMMARY OF THE INVENTION

One or more embodiments described in the specification are related to a method of recovering materials bound to a metallic substrate using cryogenic cooling. Embodiments of the invention may cool recyclable items to a low temperature to induce embrittlement of metals, thereby increasing recovery efficiency and yield.

One or more embodiments of the invention may enable recovery of one or more target materials bound to a metallic substrate using the following steps: obtaining a source stream of recyclable items, cryogenically cooling the stream, applying mechanical forces to break apart the metallic substrate into pieces, forming a mixture stream containing pieces of the substrate and all or a portion of the target materials, and feeding the mixture stream into a separator to separate the target materials from the substrate pieces. The recyclable items in the source stream may each have a metallic substrate to which one or more target materials are coupled. The cryogenic cooling reduces the temperature of the stream to a point that induces embrittlement of the metallic substrates. Mechanical forces applied to the embrittled substrates breaks these substrates into pieces, and releases all or a portion of the target materials. The separator generates one or more first fractions that contain the substrate pieces, and one or more second fractions that contain target materials. In one or more embodiments the separator may have one or more screen meshes that separate pieces or particles by size.

In one or more embodiments of the invention, each recyclable item contains all or a portion of a metal foil catalytic converter substrate, and the target materials are one or more platinum group metals, such as platinum, palladium, and rhodium.

In one or more embodiments, cryogenic cooling may be performed by mixing the source stream with liquid nitrogen. The resulting cooled stream may be cooled to a temperature at or below minus 150 degrees Fahrenheit. In one or more embodiments the cooled stream may be cooled to a temperature at or below minus 200 degrees Fahrenheit. In one or more embodiments the cooled stream may be cooled to a temperature at or below minus 250 degrees Fahrenheit.

Cryogenic cooling of the stream may be performed to induce embrittlement of the metallic substrate and of the target materials. Depending on the materials in the substrate and on the target materials, different temperatures may be desirable to induce embrittlement. For example, if the substrate or the target materials include iron or an iron alloy, the cooled stream may be cooled to a temperature at or below minus 150 degrees Fahrenheit. If the if the substrate or the target materials include palladium or rhodium, the cooled stream may be cooled to a temperature at or below minus 200 degrees Fahrenheit. If the substrate or the target materials include platinum, the cooled stream may be cooled to a temperature at or below minus 250 degrees Fahrenheit.

In one or more embodiments, the metallic substrate of the recyclable items may contain a FeCrAl alloy. Cryogenic cooling of the recyclable items may include mixing the source stream with liquid nitrogen in a ratio of at least one liter of liquid nitrogen to each one kilogram of FeCrAl alloy, and cooling the source stream to a temperature at or below minus 200 degrees Fahrenheit.

In one or more embodiments, each recyclable item may be a fragment from a metal foil catalytic converter substrate that is generated by a primary recovery process that recovers a portion of the target materials. The fragments may contain an additional quantity of target materials that this primary recovery process did not recover. One or more embodiments of the invention may enable recovery of some or all of this additional quantity of target materials. This process may be referred to as "secondary recovery," for example. One or more embodiments of the invention may encompass either or both of primary recovery and secondary recovery.

In one or more embodiments that perform secondary recovery, applying mechanical forces to break apart the cooled stream may include shattering the fragments using an impact mill. The impact mill may be constructed of mill materials that do not shatter or break at the temperature of the cooled stream; these mill materials may include stainless steel containing nickel, for example.

In one or more embodiments that perform secondary recovery, forming a mixture stream after applying mechanical forces to the cooled stream of fragments may include screening the pieces generated by the mechanical forces to obtain particles that pass through an output screen, and then mixing the stream of particles with a liquid. The liquid may contain an electrolyte and a surfactant. The output screen may for example be of mesh size in a range of 6 mesh to 10 mesh. (Mesh size of a screen is the number of openings in the screen per linear inch of screen; thus a larger mesh size corresponds to a finer mesh.) The mixture stream of particles plus liquid may be fed into an electrically grounded unit that agitates the stream and dissipates electrical charge on the particles. On exiting this electrically grounded unit, the stream may be fed to a separator with a screen mesh of mesh size in a range of 100 mesh to 150 mesh. The fraction of particles and liquid that passes through this screen mesh may then be processed to remove moisture, leaving the target materials (such as platinum group metals). For example, the fraction may be fed into a settling tank, and the particles may be allowed to settle to the bottom of the tank. Liquid may then be evacuated from the top of the tank, leaving a filter cake that may then be further dried with heat.

One or more embodiments of the invention may perform or include primary separation, where the source stream contains metal foil catalytic converter substrates. The source stream may be cryogenically cooled, and then mechanically reduced by crushing the outer can casing of the catalytic converters, and shredding the crushed catalytic converters to release a portion of the target materials. The shredded material may be fed to a separator with a top screen and a bottom screen with a finer mesh than the top screen. The separator generates three fractions: a large pieces fraction that does not pass through the top screen, a small pieces fraction that passes through the top screen but not through the bottom screen, and a particles fraction that passes through both screens. The top screen may have for example a ¼ inch mesh size, and the bottom screen may have for example a size 10 mesh. The particles fraction contains a portion of the target materials. The large pieces fraction may be reintroduced into the shredding operation. The small pieces fraction may be input into a secondary recovery process to recover more of the target materials that remain bound to the small pieces.

One or more embodiments of the invention may encompass both primary recovery and secondary recovery. The source stream for primary recovery may be catalytic converters with metallic substrates. Primary recovery may recover a portion of the PGMs from the metallic substrates, and may generate pieces of the substrates that are transmitted to secondary recovery. Secondary recovery may further process these pieces to recover an additional quantity of the PGMs.

BRIEF DESCRIPTION OF THE DRAWINGS

The above and other aspects, features and advantages of the invention will be more apparent from the following more particular description thereof, presented in conjunction with the following drawings wherein.

DETAILED DESCRIPTION OF THE INVENTION

A method of recovering materials bound to a metallic substrate using cryogenic cooling will now be described. In the following exemplary description, numerous specific details are set forth in order to provide a more thorough understanding of embodiments of the invention. It will be apparent, however, to an artisan of ordinary skill that the present invention may be practiced without incorporating all aspects of the specific details described herein. In other instances, specific features, quantities, or measurements well known to those of ordinary skill in the art have not been described in detail so as not to obscure the invention. Readers should note that although examples of the invention are set forth herein, the claims, and the full scope of any equivalents, are what define the metes and bounds of the invention.

Figure 1:
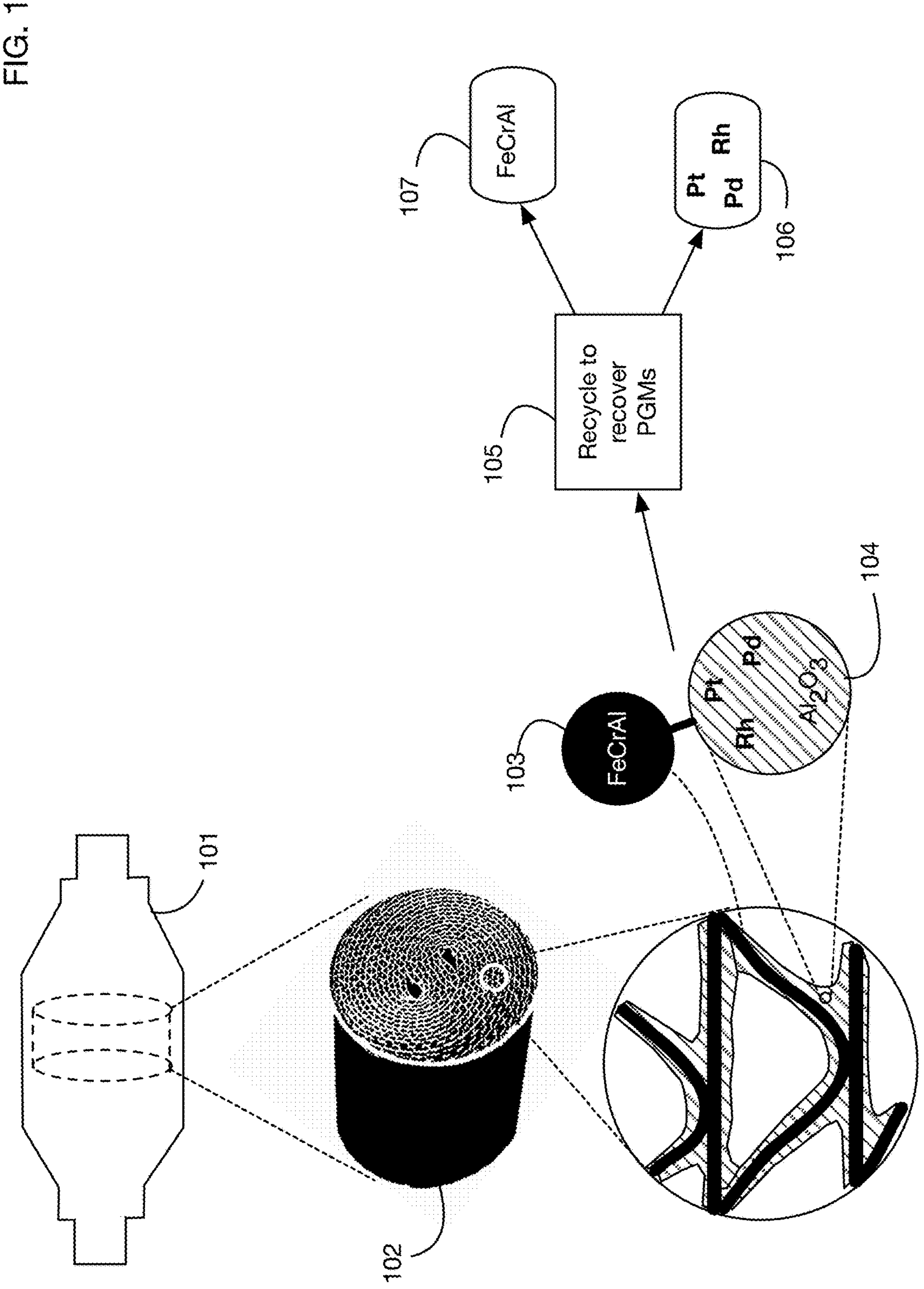
FIG. 1 shows an illustrative recycling requirement that may be addressed by one or more embodiments of the invention: recycling of metal foil catalytic converters to recover precious metals such as platinum, palladium, and rhodium bound to the metal foil substrate.

FIG. 1 shows an illustrative application of a recovery process enabled by one or more embodiments of the invention: recovery of platinum-group metals ("PGMs"), such as platinum, palladium, and rhodium, from catalytic converters with metal foil substrates. A catalytic converter 101 may contain a metal-foil substrate 102 that provides a large number of channels through which exhaust gas passes. The channels of the substrate 102 may for example be made of a FeCrAl alloy 103, or another metal or mixture of metals.

A washcoat is generally bonded to the substrate surface; the washcoat material 104 may for example contain an aluminum oxide base into which platinum-group metals are added. The PGMs act as catalysts for the conversion of exhaust gasses to other less toxic substances. PGMs used in catalytic converters may include for example, without limitation, any or all of platinum, palladium, or rhodium. Other materials may be used as catalysts instead of or in addition to these three elements.

Because the PGMs in catalytic converter washcoats are extremely valuable, a recycling process 105 may be used to recover a portion of these metals from the metallic substrate with the bonded washcoat containing the PGMs. The products of the recovery process may include the PGMs 106 and potentially the metal alloy 107 from the substrate.

The application of PGM recovery from catalytic converters is an illustrative application of one or more embodiments of the invention. One or more embodiments may be used to recover any material or materials bonded to a metallic substrate. The metallic substrate may be any structure, item, scaffolding, frame, container, part, or assembly onto which or into which one or more other materials are attached, mixed, or otherwise coupled. Bonding of materials to the substrate may be via any chemical or physical processes. Recovery of the materials may be performed for example as part of recycling of a product or structure containing the metallic substrate. Illustrative applications of embodiments of the invention in addition to PGM recovery from catalytic converters may include for example recycling of automotive air fuel ratio sensors, recycling of pre-catalytic converters, and recycling of O2 oxygen sensors post catalytic conversion. These illustrative applications also require separation of target materials from metallic substrates, and may be performed more effectively and efficiently using cryogenic cooling of materials.

Figure 2:
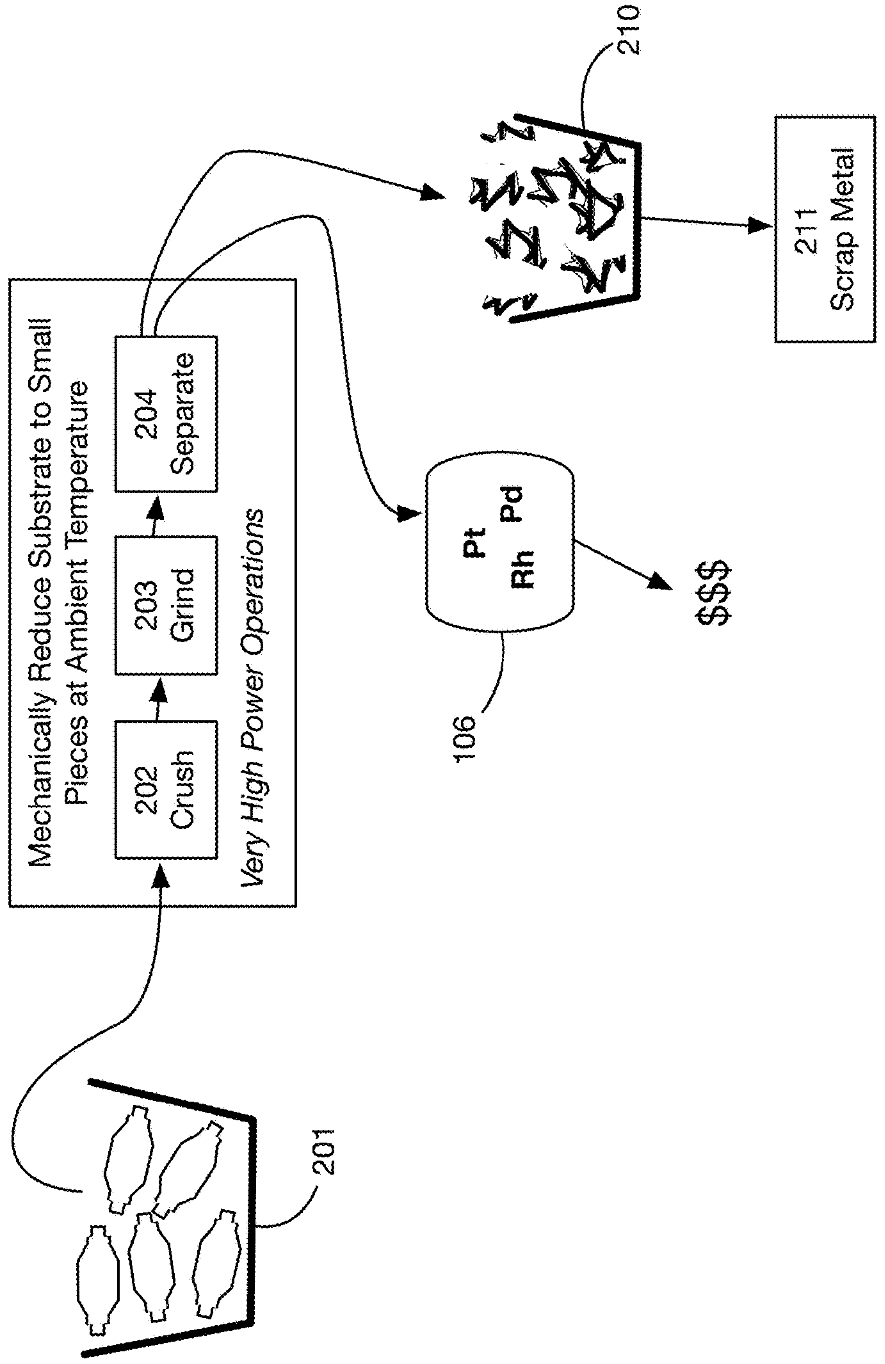
FIG. 2 shows a typical process used in the art to recover platinum-group metals from catalytic converters using high energy crushing or grinding at ambient temperature.

FIG. 2 shows an illustrative process known in the art for recovery of PGMs from a catalytic converter metal foil substrate. A batch 201 of catalytic converters to be recycled is the input into the process. The known process may for example use mechanical forces to mechanically reduce the substrate of the catalytic converters 201 to small pieces, and to separate the washcoat from these pieces using high mechanical forces. For example, a crush step 202 may break the substrate into fragments, and a subsequent grind step 203 may further reduce the size of these fragments. A separation step 204, such as a screening operation, may filter out the remaining metallic fragments from the liberated washcoat materials. The fractions from step 204 may therefore include a fraction containing the PGMs 106, and a fraction 210 containing metallic fragments. These fragments 210 may for example be waste or they may be recycled as scrap metal 211.

While the process illustrated in FIG. 2 does recover some of the PGMs in the catalytic converters 201, the recovery is incomplete because the substrate fragments 210 still contain a significant amount of PGMs in washcoat that remains attached to the fragments. Because of the high price and scarcity of PGMs, it is attractive to recover all residual PGMs in the fragments 210; however, existing processes known in the art simply recycle the fragments as scrap metal rather than performing additional recovery operations to obtain the remaining PGMs. In addition, the recovery operations 202 and 203 are energy intensive because very high-power machines are required to crush, grind, or otherwise mechanically reduce the catalytic converters 201 and to liberate a portion of the PGMs 106. And finally, the separation step 204 is typically performed in air (for example with a vibratory screen), which limits the extent to which PGMs can be separated from the fragments to which they are bonded.

Figure 3:
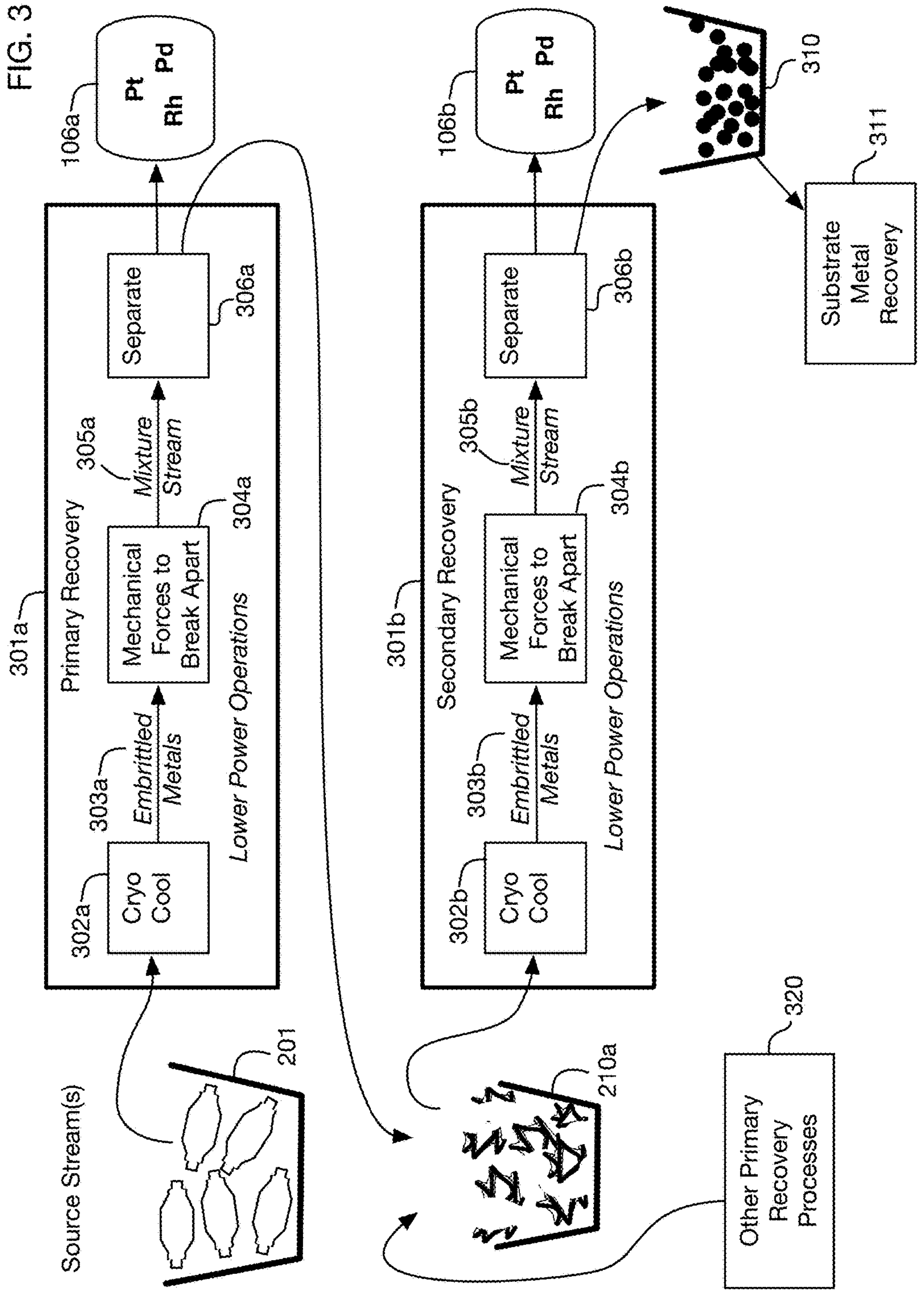
FIG. 3 shows an overview of a recovery process enabled by one or more embodiments of the invention. This illustrative process uses a primary recovery stage followed by a secondary recovery stage; each stage begins by cryogenically cooling materials to embrittle metals to facilitate mechanical reduction and separation.

One or more embodiments of the invention may improve the yield and efficiency of recycling operations to recover PGMs or other materials bound to a metallic substrate, such as the substrate of a catalytic converter. FIG. 3 shows an overview flowchart of one or more embodiments of the invention that provide these improvements. The recovery process illustrated in FIG. 3 includes a primary recovery stage 301*a* and a secondary recovery stage 301*b*. The primary recovery stage 301*a* obtains a source stream 201 of recyclable items, such as catalytic converters or parts thereof. It generates recovered materials 106*a*, and pieces, fragments, or other byproducts 210*a* that may contain additional quantities of the target materials (such as PGMs) that have not been recovered in the primary recovery. The stream 210*a* is then input into a secondary recovery stage 301*b*. Secondary recovery recovers additional quantities of the target materials 106*b*, and residual metal fragments or particles 310 that may be input to a metal recovery process 311.

One or more embodiments of the invention may include primary recovery only, secondary recovery only, or both primary and secondary recovery. One or more embodiments may include more than two stages of recovery, or any number of stages. In one or more embodiments, secondary recovery may be performed on materials obtained from one or more other primary recovery processes 320, instead of or in addition to materials output from a primary recovery process 301*a* enabled by the embodiment. For example, without limitation, the source stream 210*a* for secondary recovery stage 301*b* may be obtained from or mixed with an output 210 from the existing process shown in FIG. 2.

In the embodiment illustrated in FIG. 3, the major types of steps in primary recovery 301*a* and secondary recovery 301*b* are similar: each includes a cryogenic cooling step, followed by a mechanical reduction step, and then followed by a separation step. The detailed operations within these steps may differ considerably between primary and secondary separation, as described below for example. Moreover, additional steps may be present in one or more embodiments in either or both of primary and secondary recovery. Source stream 201 contains recyclable items with one or more target materials bound to a metallic substrate. This source stream is input into a cryogenic cooling step 302*a* that cools the source stream items to a low temperature where the metals in the items become embrittled. The cooled stream 303*a* with embrittled metals is then input into one or more mechanical reduction steps 304*a*, which use mechanical forces to break apart the metallic substrate into pieces. Because the metals are embrittled, the forces and power required to break apart the substrate are considerably lower than those of typical mechanical reductions such as the steps 202 and 203 illustrated in FIG. 2. The mechanical reduction step or steps 304*a* may also liberate a portion of the target materials (such as PGMs) from the substrate. The pieces of the mechanical substrate and the liberated target materials are combined into a mixture stream 305*a*, with other materials potentially added as well into this mixture, and this stream 305*a* is input into a separation step 306*a*. The separation step 306*a*, which may for example screen or sort particles by size or other properties into different fractions, generates recovered target materials 106*a*, and remaining substrate pieces 210*a*. Secondary recovery 301*b* may proceed to recover additional target materials from the substrate pieces 210*a*. The major steps of secondary recovery may be similar to those of primary recovery: cryogenic cooling 302*b* to form a cooled stream 303*b* with embrittled metals, followed by application of mechanical forces 304*b* to break the pieces into smaller particles and liberate additional target materials, followed by formation of a mixture stream 305*b* that is separated in step 306*b* into target materials fraction 106*b* and metal particles 310. As described in detail below, separation step 306*b* may be performed in an aqueous solution, rather than in air, which may increase the effectiveness of this step.

Cryogenic cooling in primary or secondary recovery may be performed to induce embrittlement of the metals in the source streams. In recovery of PGMs from catalytic converters, this cooling may for example rearrange the atomic structure of metal foil catalytic converter substrates (which may be for example FeCrAl alloys), thereby causing metal embrittlement. Pretreating the source streams to embrittle the metals may produce materials that are suitable for introduction into mechanical reduction operations, such as crushing, grinding, pulverizing, and shredding. The embrittled metals may be easier to break into pieces with lower-power, lighter duty equipment, making the mechanical reduction steps more energy efficient. Lower-power, lighter duty equipment may also require less capital and less expenditure for maintenance.

Figure 4:
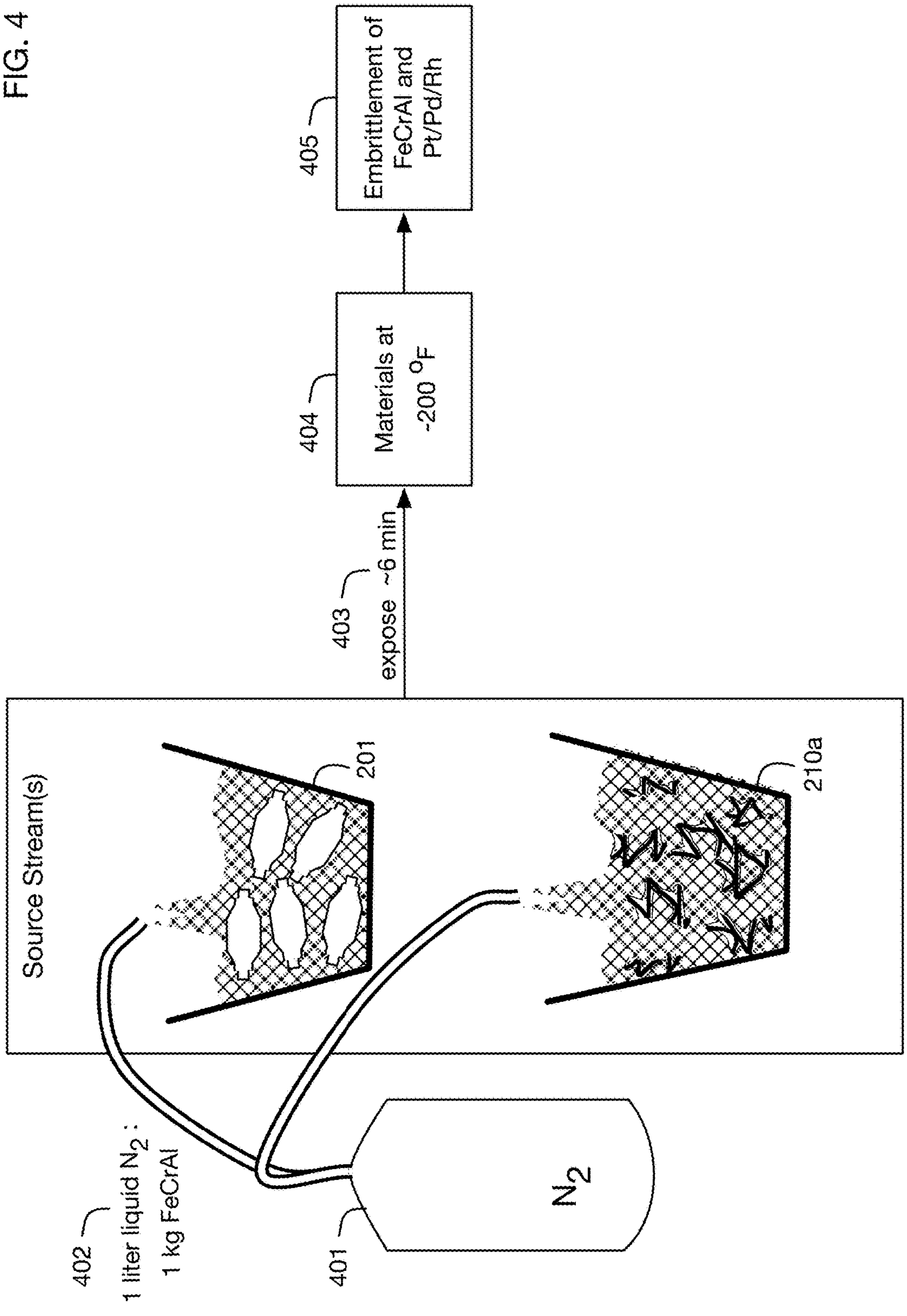
FIG. 4 shows an illustrative cryogenic cooling process that may be used in primary or secondary recovery in one or more embodiments.

FIG. 4 shows an illustrative cryogenic cooling process that may be used in one or more embodiments. Liquid nitrogen 401 may be added to source stream 201 or 210*a* (or both), for example by spraying liquid nitrogen onto the materials or flooding a container of materials with liquid nitrogen. Embrittlement occurs in ferritic steel alloys at extremely low temperatures—typically at minus 150 degrees Fahrenheit. Embrittlement temperatures for PGMs are not readily known in the art; however, the inventor has determined experimentally that palladium and rhodium are embrittled at approximately minus 200 degrees Fahrenheit, and platinum is embrittled at approximately minus 250 degrees Fahrenheit. Because liquid nitrogen has a temperature of approximately minus 320 degrees Fahrenheit, exposure to a sufficient quantity of liquid nitrogen for a sufficient time can successfully embrittle almost all metals of interest, either substrate materials or target metal materials. Illustrative exposure parameters that may be used in one or more embodiments may be for example use of a quantity of liquid nitrogen in a ratio 402 of one liter of liquid nitrogen for every one kilogram of FeCrAl in the source stream, and exposing the source material to this quantity for a time 403 of approximately 6 minutes. These parameters may result in cooling the source materials to temperature 404 of minus 200 to minus 250 degrees Fahrenheit (depending on the PGMs present in the catalytic converters), which induces embrittlement 405 of both FeCrAl and PGMs. These parameters are illustrative; one or more embodiments may use different amounts and exposure times, for example for different types of source streams, metallic substrates, and target materials. In one or more embodiments, more than one liter of liquid nitrogen per kilogram of FeCrAl may be used, for example to cool the stream faster. Use of liquid nitrogen as a cryogenic cooling solution is also illustrative; one or more embodiments may use any type of cooling to induce embrittlement of one or more metals in the source stream or streams.

Figure 5:
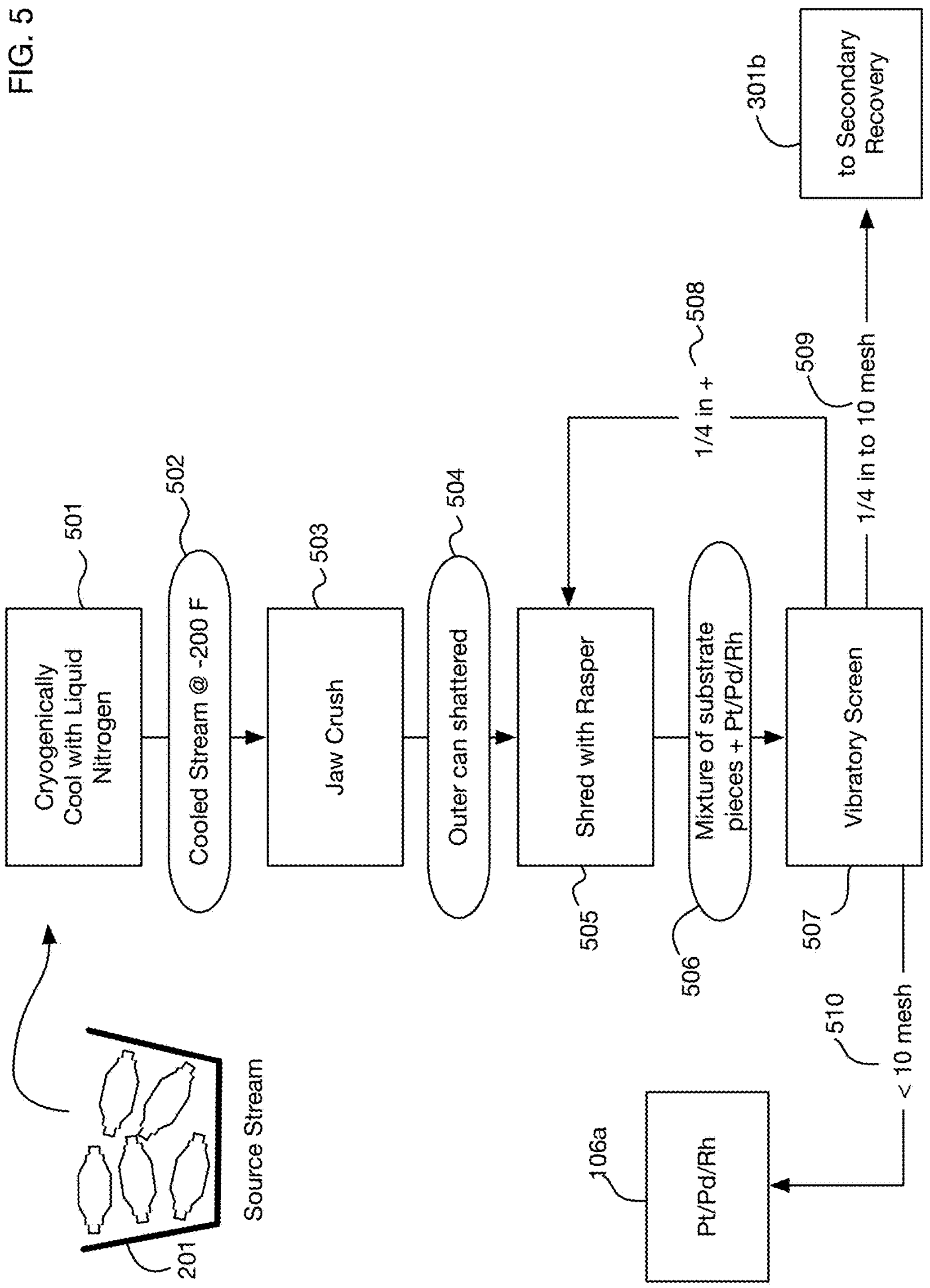
FIG. 5 shows a flowchart of an illustrative primary recovery process that may be used in one or more embodiments.
Figure 6:
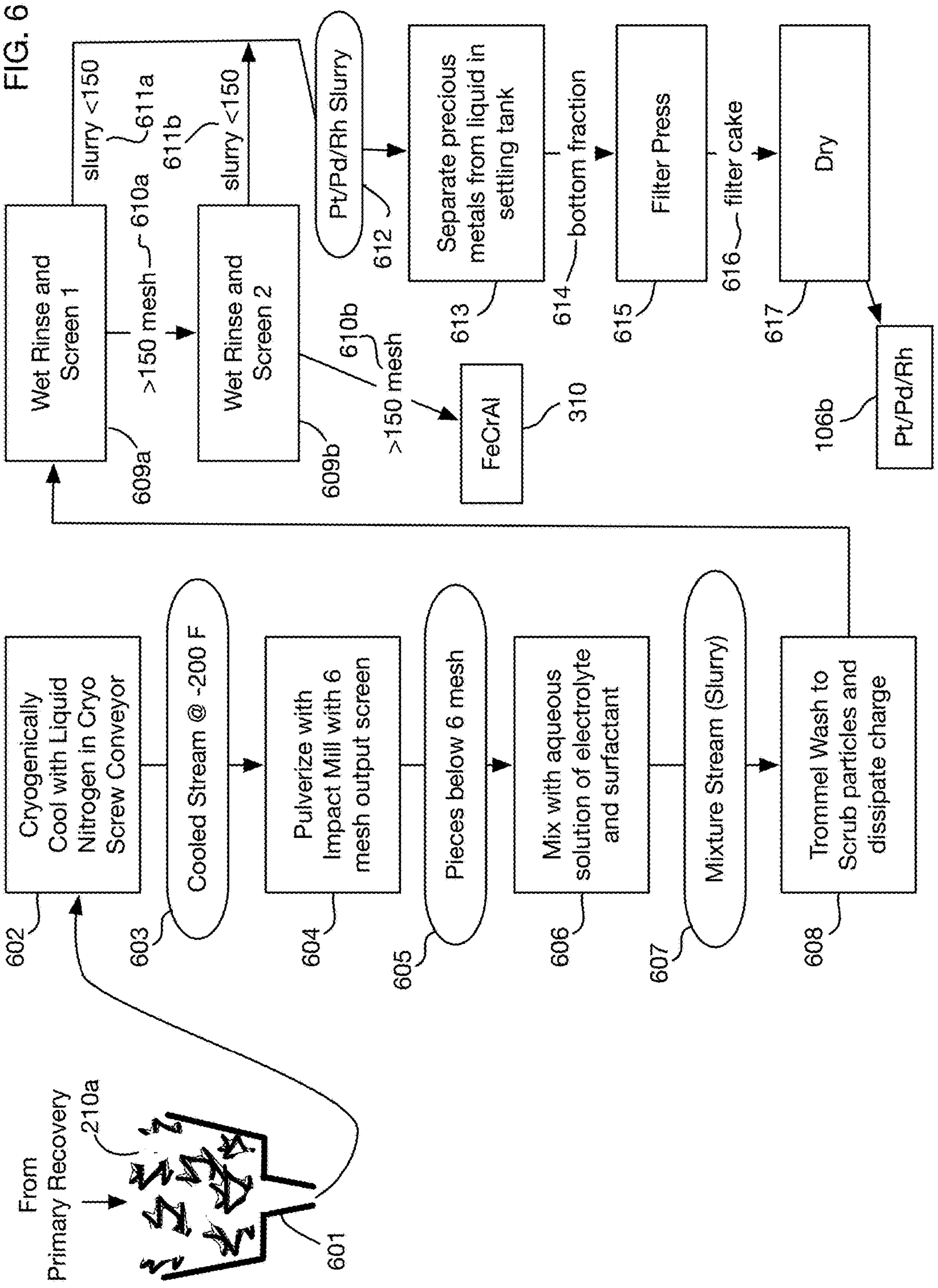
FIG. 6 shows a flowchart of an illustrative secondary recovery process that may be used in one or more embodiments.

FIGS. 5 and 6 show illustrative operations that may be used in one or more embodiments to perform the steps of primary and secondary recovery, respectively. The example processes and operations shown in these figures illustrate recovery of PGMs from catalytic converter metallic foil substrates; similar processes may be used in one or more embodiments for recovery of other target materials from other metallic substrates.

Figure 7:
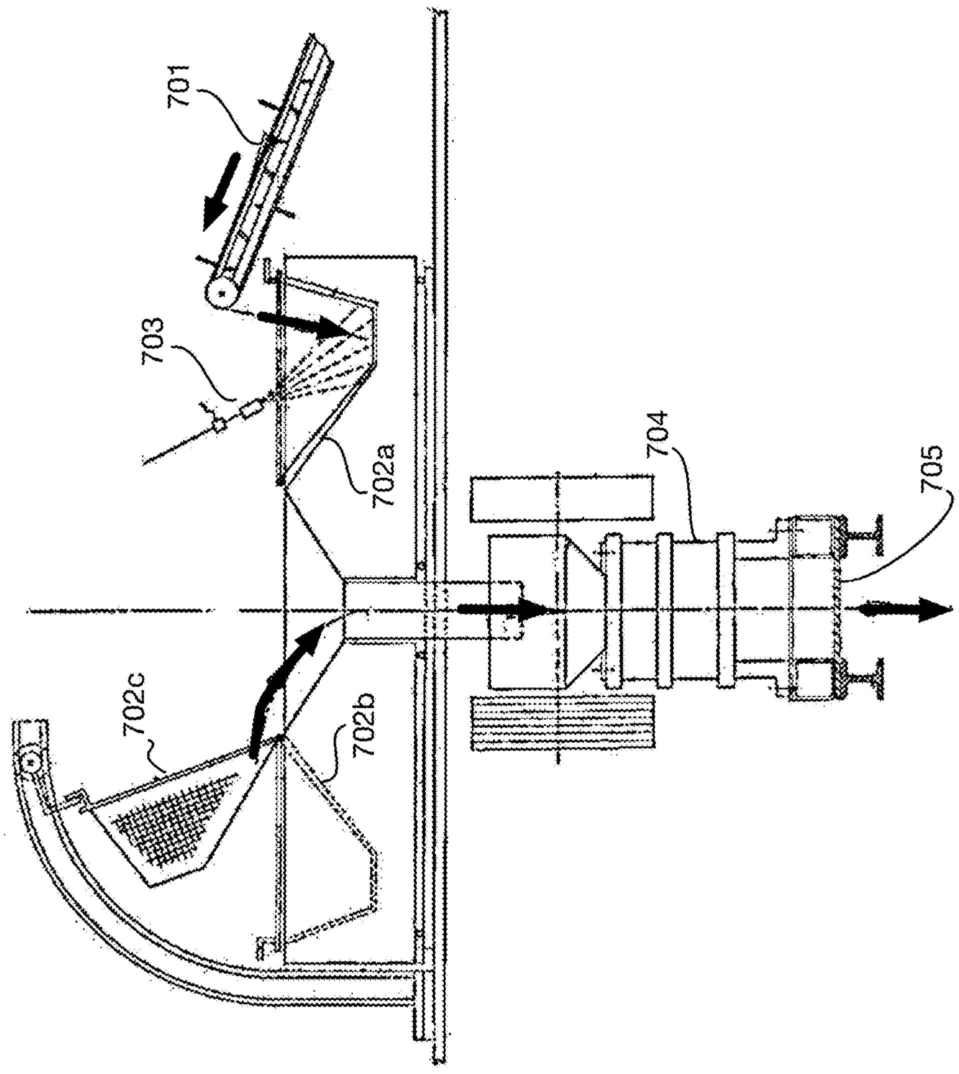
FIGS. 7 and 8 show side and top views, respectively, of a customized carousel that may be used in one or more embodiments of the invention to receive and cryogenically cool recyclable material, and then to feed the cooled material to a crushing unit.
Figure 8:
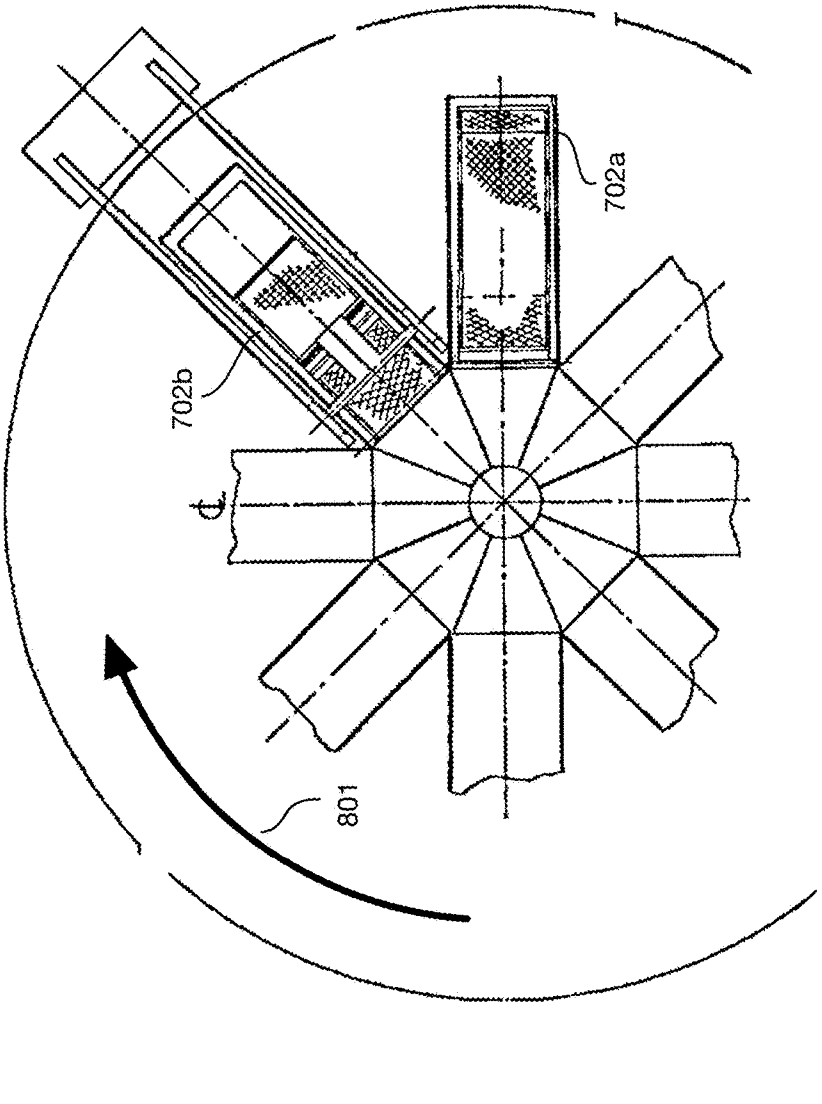

In the primary recovery stage shown in FIG. 5, source stream 201 contains catalytic converters or portions thereof. This stream is input into cryogenic cooling operation 501, which uses liquid nitrogen as described in FIG. 4 to generate a cooled stream of material 502 at approximately minus 200 degrees to minus 250 degrees Fahrenheit. This cooling operation may be performed for example by loading a batch of metal foil catalytic converter substrates into a vessel compartment. Liquid nitrogen may be flooded into the vessel, filling the vessel sufficiently to cover the top layer of material. Initially the material will vigorously react to the cooling process. After exposure for approximately 6 minutes, the material will be sufficiently cooled and the metals embrittled. FIGS. 7 and 8 below show equipment that may be used for this cooling operation in one or more embodiments.

Batches of the cooled stream 502 (such as a batch in a vessel container) may then be discharged into a jaw crusher for crushing operation 503. The purpose of this operation is to shatter the outer can casing fraction of the metal foil catalytic converter substrates material, reducing the screen size and thereby liberating dissimilar materials and delivering stress relief for downstream shredding operations. Jaw crushers vary from laboratory sized through large rock crushing units. Most are simply not suited for this operation. An illustrative unit that is effective for this operation is a Lippmann Engineering model #490306 with 15"×24" manganese jaws fitted with a 30 hp electric motor. The cryogenically treated metal foil catalytic converter substrates (FeCrAl alloys) may be gravity fed into the jaw crusher. The crusher may be set to shatter the outer can casing with an approximate 1" jaw setting. Efficient crushing or shattering requires the use of “choke feeding” of the jaw crusher and must be strictly observed, hence the need for basket batch feeding. The crushed material 504, with the outer can shattered, may be discharged into a hopper located beneath the crusher and sent to the shredding operation 505 for further mechanical reduction.

The purpose of shredding operation 505 is to reduce the size of the crushed material 504, and to liberate the majority of platinum group metals and ceramic of the crushed metal foil catalytic converter substrates. Crushed material may be reduced for example to particles of size ¼" or smaller. These particles may then be fed into a secondary recovery process, as described below with respect to FIG. 6. Metal foil catalytic converter substrates (FeCrAl alloys) will exit the jaw crusher and enter the rasper. The rasper may for example have a single high-speed rotor with many specially hardened grinding teeth. The material will be forced between the rotor and fixed anvil. This results in a high liberation of the coating of ceramic and precious metals from the FeCrAl alloy substrate. An illustrative rasper that may be used for shredding is a 75 HP rasper single rotor fitted with a ¼" output screen. Illustrative manufacturers that provide suitable raspers include for example SSI and Komar.

The output of the shredding operation 505 is a mixture 506 containing pieces of shredded substrate and liberated PGMs and ceramic material from the washcoat. This mixture 506 is input into a vibratory screening operation 507 to separate the PGMs and ceramic fraction from the FeCrAl substrate. An illustrative screening operation may for example use a vibratory screen fitted with a top ¼" screen, and a bottom screen of size 10 mesh. An illustrative manufacturer of an appropriate vibratory screen is Sweco. The vibratory screen may be fitted with a top to eliminate dust from the screening operation. This screening operation will produce three fractions. The first fraction 508 is pieces and particles of size greater than ¼". This fraction may be reintroduced into the rasper shredding operation 505. The second fraction 509 is particles of size between ¼" and 10 mesh. These particles may for example be fed to secondary recovery stage 301*b* to recover additional PGMs. The third fraction 510 is particles of size less than 10 mesh. This fraction contains an extremely high concentration of the precious metals 106 recovered and is suitable for shipment to a precious metal smelter.

FIG. 6 shows illustrative operations that may be used in secondary recovery in one or more embodiments. Source stream 210*a* for secondary recovery may for example contain the fraction 509 from primary recovery as illustrated in FIG. 5. It may also or alternatively contain material from a different primary recovery process. The source stream may be fed for example into a bulk hopper feeder 601. When coupled to a primary recovery process such as the process shown in FIG. 5, the hopper 601 may act as a surge bin for receiving shredded metal fragments from the vibratory screen output second fraction 509. Shredded metal foil catalytic converter substrates (FeCrAl alloys) flows from the vibratory screen into the hopper. The hopper 601 acts as interim storage of the material as it flows out its bottom discharge outlet conveyed by the vibrating feeder into the cryogenic auger described below. A suitable hopper is for example a large bulk hopper with enough cubic feet of capacity, fitted with appropriate Syntron or equivalent type vibratory discharge feeder.

Output from the hopper 601 is input into cryogenic cooling operation 602. As described above with respect to primary recovery, the purpose of cryogenic cooling is to induce metal embrittlement. This may be achieved by mixing liquid nitrogen with the material in a ratio of one liter of nitrogen to each one kilogram of FeCrAl. An illustrative cryogenic cooling operation may for example use a cryogenic screw conveyor manufactured out of stainless steel. The conveyor unit may for example be PLC controlled with three cooling zones, allowing for precise control of the material feed and the liquid nitrogen input. The shredded metal foil catalytic converter substrates (FeCrAl alloys) exit the bulk feeder hopper 601 into this cryogenic screw conveyor. As the material moves through the tunnel, liquid nitrogen is sprayed onto the FeCrAl metal foil substrates. At the time FeCrAl metal foil substrates exit the cryogenic screw conveyor, optimum metal embrittlement temperature has been achieved in cooled stream 603. The screw conveyor turns sufficiently slowly (for example, at 5 RPM) to allow the metal to cool to the desired temperature.

Cooled stream 603 is then input into pulverizing operation 604. This operation reduces the feed particles (which may be up to ¼" in size) to below 6 mesh. An illustrative impact mill that may be used for pulverizing is a 30 HP Fitzmill pulverizer hammer mill. All contact parts of the mill must be made of materials that do not shatter at the negative 200 to negative 250 degrees Fahrenheit temperature of the cooled stream 603. For example, they may be made of stainless-steel construction containing nickel for safe cryogenic grinding operations. The mill may be operated for example at 3,600 rpm, and may be fitted with a 6 mesh output screen. In one or more embodiments a finer mesh output screen may be used, for example an output screen in the range of 6 mesh to 10 mesh. A finer output mesh may reduce particle sizes for downstream operations, which may improve downstream efficiency; however, it may also reduce throughput from the pulverizing operation. Different embodiments of the process may therefore use different mesh sizes to optimize various aspects of the process.

The cooled stream 603 of ¼" or below metal foil catalytic converter substrates (FeCrAl alloys) at embrittlement temperature may be continuously feed into the impact mill. Shattering occurs in this step followed by attrition grinding. Shattering will liberate the ceramic coated with precious metals during the introduction of embrittled low temperature feed stock traveling at slow speed then encountering ultra-high-speed hammers. The energy transmission at the point of contact will produce the desired shattering effect. This coupled with additional attrition grinding will cause any platinum or palladium metal alloyed on the surface with the FeCrAl alloy (diffusion bonding of platinum metals) to liberate (sand blasting affect) and become free. Static electricity produced by the high-speed rotor will cause all the dissimilar particles to obtain a positive electrical charge and become attracted hence coating one another. This static electrical charge must be dissipated in the downstream equipment to optimize recovery of precious metals.

The output 605 from the impact mill contains particles of size below 6 mesh. These particles are then mixed in step 606 with an aqueous solution to form a mixture stream 607. This mixing may occur for example in a water injection plenum. An illustrative plenum may be for example a stainless-steel plenum that may be mounted directly underneath and attached to the pulverizer, with two opposing water injector spray nozzles. As the pulverized mixed metal stream exits the pulverizer screen and enters the water injection plenum it encounters the water injector spray nozzles. The desired effect is to produce a slurry and coat all particles with process water that has been conditioned. The water may for example be a solution containing an electrolyte and a surfactant. This conditioned process water acts as a wetting agent as well as an electrolyte. The surfactant reduces surface tension, allowing for better mixing of the particles in the aqueous solution. Mixing the particles with process water also prevents the formation of dust, which would otherwise cause loss of some of the PGM particles.

The slurry 607 then flows to a trommel unit for a wash operation 608. This operation has two purposes: First it dissipates the static electrical charge all particles have acquired in the pulverizer. Second it acts as a washing unit to scrub particles clean to free all dissimilar particles from each another. This scrubbing is more effective at separating particles than an air separation with a vibratory screen. An illustrative trommel that may be used in one or more embodiments is a 5 hp trommel fitted with lift bars and an exit screen for material to freely exit the machine. The unit should be adequately grounded to earth. The trommel unit may rotate at approximately 25 RPM. As the slurry travels through the trommel it encounters lift bars that create turbulence and contact with the metal parts of the trommel. The conditioned water provides the necessary conductivity for the static electrical charge to run to ground through the unit, thereby freeing all particles from attraction to each other. The washed and grounded slurry exits and flows to a wet screening operation.

Wet screening performs final separation of the slurry into a fraction containing PGMs and ceramic and a fraction containing the FeCrAl substrate. The illustrative wet screening process shown in FIG. 6 performs two stages 609*a* and 609*b* of rinsing and screening. One or more embodiments may use any number of wet screening stages. Each screening stage may use a vibratory screen, for example a screen manufactured by Sweco. The two vibratory screens used in wet rinse and screen operations 609*a* and 609*b* may for example each be fitted with a single 150 mesh wire cloth screen. Each screening operation produces two fractions. The first fraction produced is 150 mesh plus FeCrAl metal reject. The second fraction is the precious metal water slurry. As the trommel unit discharges the mixed metal slurries onto the first vibratory screen, rinse water is applied at varies points across the screen rinsing the metal slurry. The liberated precious metal fraction 611*a* of the slurry is 300-600 mesh and it classifies and separates from the FeCrAl metal. The rinsed FeCrAl metal 610*a* is discharged from the first vibratory screen and enters the second vibratory screen for a final rinse phase 609*b*. The rinse water 611*a* from the first stage 609*a* is combined with rinse water 611*b* from the second stage to form rinse water 612; this rinse water 612 contains the PGMs. The rinse water stream 612 is pumped to a settling tank. The rinsed FeCrAl metal 310 discharges into a bulk bag (super sack) for collection. This metal 310 may for example shipped to a steel processor for melting and fabrication into new ferritic alloy products.

In one or more embodiments of the invention, the screening operations 609*a* and 609*b* may use output screens with a mesh size below 150 mesh, for example a mesh size between 100 mesh and 150 mesh. The optimal mesh size may depend for example on the output screen size from the pulverizing operation 604. For example, with a 6 mesh output screen for pulverizing, the wet screening operations 609*a* and 609*b* may use screens of size 100 mesh; with a 10 mesh output screen for pulverizing, the wet screening operations 609*a* and 609*b* may use screens of size 150 mesh. These mesh size values are illustrative; one or more embodiments may use any desired mesh sizes for any of the steps in the process.

The PGM-bearing slurry 612 is input to operation 613 to remove the PGMs from the rinse water. One or more settling tanks receive the slurry. Settling tanks may be for example cone shaped bottom discharge poly tanks of adequate storage capacity to accommodate the desired product flows. An empty tank accepts PGM-bearing slurry process water from wet screening operations 609*a* or 609*b*. After the tank has filled it can settle thereby clarifying the process water. The clarified process water is pumped off the settled slurry and may be reused in the wet screening operation. The precious metals bearing slurry is now concentrated into a mud/sludge fraction and bottom discharged and pumped out of settling tank as bottom fraction 614.

Since the fraction 614 still contains some liquid, it is pumped into a filter press operation 615 from the settling tank. A filter press may be for example an air operated double diaphragm 1½-2" pump and standard plate a frame filter press of appropriate size to handle the volume of desired filter cake. Full air is blown through the filter press to evacuate as much process water as possible. The filter press is then opened, and each plate releases the precious metal bearing filter cake 616 into a hopper for collection.

The filter cake 616 is then dried in operation 617 to remove all moisture content, rendering a dry product suitable for shipment and acceptance to a precious metal smelter. A dryer may be for example a gas operated sludge dryer manufactured by JWI or equivalent stainless-steel conveyor belt with attached feed hopper and standard heating zones. The feed hopper is loaded with a PGM bearing filter cake. The unit drops pellets of filter cake onto a stainless-steel conveyor and slowly conveys material through gas fired heating zones. Dried material 106*b* containing the PGMs exits the sludge dryer and is collected in a hopper prior to shipment to the precious metal smelter.

The equipment described above for the various operations in primary and secondary recovery is illustrative; one or more embodiments may use any types of equipment to perform these operations. Equipment may be off-the-shelf or custom built, or any combination thereof. For some operations, equipment must meet certain specifications; for example, for mechanical reduction of cryogenically cooled streams, equipment must be made of materials that do not shatter when contacting the cooled streams.

FIGS. 7 and 8 show an illustrative embodiment of customized equipment that may be used for example for cryogenic cooling step 501 of primary separation. This apparatus is an eight-vessel freezing carousel. Recyclable items are loaded into each vessel compartment on a conveyor system 701. Items are fed from the conveyor 701 into vessel 702*a*. Each outer freezing vessel is fabricated of stainless steel with hinged perforated stainless-steel inner baskets. Approximately 200 lb. of metal foil catalytic converter substrates is loaded into each vessel compartment. Liquid nitrogen is flooded into the vessel 702*a* by dispenser 703 enough to cover the top layer. Vessel 702*a* is then rotated into discharge position 702*b*, and the basket 702*c* is tipped upward to discharge the frozen contents into jaw crusher 704, which lies below the carousel. Crushed material is discharged from the bottom 705 of the jaw crusher 704. FIG. 8 shows a top view of the carousel, showing the eight vessels, the loading and filling position 702*a*, and the discharge position 702*b*. The carousel rotates in the sense 801, moving vessels from the loading position 702*a* to the discharge position 702*b*. The cycle time to rotate from loading to discharge positions is sufficiently long to cool the material in the vessel to the target minus 200 degrees to minus 250 degrees Fahrenheit.

While the invention herein disclosed has been described by means of specific embodiments and applications thereof, numerous modifications and variations could be made thereto by those skilled in the art without departing from the scope of the invention set forth in the claims.

What is claimed is:

1. A method of recovering materials bound to a metallic substrate using cryogenic cooling, comprising:

obtaining a source stream comprising a multiplicity of recyclable items, each recyclable item comprising a metallic substrate; and one or more target materials coupled to said metallic substrate, wherein said each recyclable item comprises all or a portion of a metal foil catalytic converter substrate;

said one or more target materials comprise one or more of platinum, palladium, and rhodium;

said each recyclable item comprises a fragment from said all or said portion of said metal foil catalytic converter substrate that is generated by a primary recovery process configured to recover a first portion of said one or more target materials; and, said fragment comprises an additional quantity of said one or more target materials that was not recovered in said primary recovery process;

cryogenically cooling said source stream to form a cooled stream, wherein a temperature of said cooled stream induces embrittlement of said metallic substrate of said multiplicity of recyclable items;

applying mechanical forces to said multiplicity of recyclable items in said cooled stream to break apart said metallic substrate into pieces, and to release all or a portion of said one or more target materials from said metallic substrate, wherein said applying mechanical forces to said multiplicity of recyclable items in said cooled stream comprises shattering fragments in said cooled stream using an impact mill;

forming a mixture stream comprising all or a portion of said pieces and said all or a portion of said one or more target materials; and, feeding said mixture stream into a separator to separate said mixture stream into one or more first fractions containing said all or a portion of said pieces, and one or more second fractions containing said all or a portion of said one or more target materials.

2. The method of claim 1, wherein one or more of said metallic substrate and said one or more target materials comprise iron or an iron alloy; and, said cryogenically cooling said source stream comprises mixing said source stream with liquid nitrogen to cool said cooled stream to a temperature at or below minus 150 degrees Fahrenheit.

3. The method of claim 1, wherein one or more of said metallic substrate and said one or more target materials comprise palladium or rhodium; and, said cryogenically cooling said source stream comprises mixing said source stream with liquid nitrogen to cool said cooled stream to a temperature at or below minus 200 degrees Fahrenheit.

4. The method of claim 1, wherein one or more of said metallic substrate and said one or more target materials comprise platinum; and, said cryogenically cooling said source stream comprises mixing said source stream with liquid nitrogen to cool said cooled stream to a temperature at or below minus 250 degrees Fahrenheit.

5. The method of claim 1, wherein said metallic substrate comprises a FeCrAl alloy; and, said cryogenically cooling said source stream comprises mixing said source stream with liquid nitrogen in a ratio of at least 1 liter of liquid nitrogen to each 1 kilogram of FeCrAl alloy to cool said cooled stream to a temperature at or below minus 200 degrees Fahrenheit.

6. The method of claim 1, wherein said separator comprises a screen mesh.

7. The method of claim 1, wherein said impact mill is constructed of one or more mill materials that do not shatter or break at said temperature of said cooled stream.

8. The method of claim 7, wherein said one or more mill materials comprise stainless steel containing nickel.

9. The method of claim 1, wherein said forming said mixture stream comprises screening said pieces and said all or a portion of said one or more target materials with an output screen, wherein a particles stream passes through said output screen; and, mixing said particles stream with a liquid to form said mixture stream, wherein said liquid comprises an electrolyte and a surfactant.

10. The method of claim 9, wherein said output screen comprises mesh size in a range of size 6 mesh to size 10 mesh.

11. The method of claim 9, further comprising feeding said mixture stream into an electrically grounded unit before said feeding said mixture stream into said separator, wherein said electrically grounded unit is configured to agitate said mixture stream and to dissipate electrical charge on particles in said mixture stream.

12. The method of claim 9, wherein said separator comprises a screen mesh of mesh size in a range of 100 mesh to 150 mesh.

13. The method of claim 9, further comprising removing moisture from said one or more second fractions.

14. The method of claim 13, wherein said removing moisture from said one or more second fractions comprises feeding said one or more second fractions into a settling tank;

waiting for said all or a portion of said one or more target materials to settle to a bottom of said settling tank;

evacuating liquid from a top of said settling tank to form a filter cake; and, drying said filter cake with heat.

15. The method of claim 1, wherein said applying mechanical forces to said multiplicity of recyclable items in said cooled stream comprises crushing an outer can casing of said each recyclable item to form crushed material; and, shredding said crushed material to form shredded material and to release said all or a portion of said one or more target materials from said crushed material; and, said mixture stream comprises said shredded material and said all or a portion of said one or more target materials.

16. The method of claim 15, wherein said separator comprises a top screen comprising a first mesh size, and a bottom screen comprising a second mesh size greater than said first mesh size;

said one or more second fractions containing said all or a portion of said one or more target materials comprise particles in said mixture stream that pass through said top screen and said bottom screen; and, said one or more first fractions containing said all or a portion of said pieces comprise a large pieces fraction that does not pass through said top screen; and a small pieces fraction that passes through said top screen and does not pass through said bottom screen.

17. The method of claim 16, wherein said first mesh size is ¼ inches; and, said second mesh size is 10 mesh.

18. The method of claim 16, further comprising reintroducing said large pieces fraction into said shredding; and, processing said small pieces fraction in a secondary recovery process to recover an additional quantity of said one or more target materials that is bound to said small pieces fraction.

19. A method of recovering materials bound to a metallic substrate using cryogenic cooling, comprising:

obtaining a primary source stream comprising a multiplicity of recyclable items, each recyclable item comprising a metallic substrate; and one or more target materials coupled to said metallic substrate;

cryogenically cooling said primary source stream to form a cooled primary stream, wherein a temperature of said cooled primary stream induces embrittlement of said metallic substrate of said multiplicity of recyclable items;

applying first mechanical forces to said multiplicity of recyclable items in said cooled primary stream to break apart said metallic substrate into pieces, and to release a first portion of said one or more target materials from said metallic substrate;

forming a first mixture stream comprising all or a portion of said pieces and said first portion of said one or more target materials;

feeding said first mixture stream into a first screen mesh separator to separate said first mixture stream into a large pieces fraction comprising large pieces in said first mixture stream that are larger than a first value;

a small pieces fraction comprising small pieces in said first mixture stream that are smaller than or equal to said first value and larger than a second value; and a first target material recovery fraction comprising particles in said first mixture stream smaller than or equal to said second value, wherein said first portion of said one or more target materials is substantially in said first target material recovery fraction;

reintroducing said large pieces fraction into said applying first mechanical forces;

forming a secondary recovery source stream comprising said small pieces fraction;

cryogenically cooling said secondary recovery source stream to form a cooled secondary stream, wherein a temperature of said cooled secondary stream induces embrittlement of said metallic substrate of said all or a portion of said small pieces;

shattering said small pieces in said cooled secondary stream using an impact mill, wherein said impact mill is constructed of one or more mill materials that do not shatter or break at said temperature of said cooled secondary stream;

screening an output of said impact mill with an output screen, wherein a particles stream passes through said output screen;

mixing said particles stream with a liquid to form a second mixture stream, wherein said liquid comprises an electrolyte and a surfactant;

feeding said second mixture stream into an electrically grounded unit, wherein said electrically grounded unit is configured to agitate said second mixture stream and to dissipate electrical charge on particles in said second mixture stream;

feeding said second mixture stream into a second screen mesh separator to separate said mixture stream into a first final fraction containing metallic residue, and a second final fraction containing a second portion of said one or more target materials;

feeding said second final fraction into a settling tank;

waiting for said second portion of said one or more target materials to settle to a bottom of said settling tank;

evacuating liquid from a top of said settling tank to form a filter cake; and, drying said filter cake with heat.

20. The method of claim 19, wherein said each recyclable item comprises all or a portion of a metal foil catalytic converter substrate;

said one or more target materials comprise one or more of platinum, palladium, and rhodium;

said metallic substrate comprises a FeCrAl alloy;

said cryogenically cooling said primary source stream comprises mixing said primary source stream with liquid nitrogen in a ratio of at least 1 liter of liquid nitrogen to each 1 kilogram of FeCrAl alloy to cool said cooled primary stream to a temperature at or below minus 200 degrees Fahrenheit; and, said cryogenically cooling said secondary recovery source stream comprises mixing said secondary recovery source stream with liquid nitrogen in a ratio of at least 1 liter of liquid nitrogen to each 1 kilogram of FeCrAl alloy to cool said cooled secondary stream to a temperature at or below minus 200 degrees Fahrenheit.

21. A method of recovering materials bound to a metallic substrate using cryogenic cooling, comprising:

obtaining a source stream comprising a multiplicity of recyclable items, each recyclable item comprising a metallic substrate; and one or more target materials coupled to said metallic substrate, wherein said each recyclable item comprises all or a portion of a metal foil catalytic converter substrate; and, said one or more target materials comprise one or more of platinum, palladium, and rhodium;

cryogenically cooling said source stream to form a cooled stream, wherein a temperature of said cooled stream induces embrittlement of said metallic substrate of said multiplicity of recyclable items;

applying mechanical forces to said multiplicity of recyclable items in said cooled stream to break apart said metallic substrate into pieces, and to release all or a portion of said one or more target materials from said metallic substrate;

forming a mixture stream comprising all or a portion of said pieces and said all or a portion of said one or more target materials;

feeding said mixture stream into a separator to separate said mixture stream into one or more first fractions containing said all or a portion of said pieces, and one or more second fractions containing said all or a portion of said one or more target materials, wherein said applying mechanical forces to said multiplicity of recyclable items in said cooled stream comprises crushing an outer can casing of said each recyclable item to form crushed material; and, shredding said crushed material to form shredded material and to release said all or a portion of said one or more target materials from said crushed material;

said mixture stream comprises said shredded material and said all or a portion of said one or more target materials;

said separator comprises a top screen comprising a first mesh size, and a bottom screen comprising a second mesh size greater than said first mesh size;

said one or more second fractions containing said all or a portion of said one or more target materials comprise particles in said mixture stream that pass through said top screen and said bottom screen; and, said one or more first fractions containing said all or a portion of said pieces comprise a large pieces fraction that does not pass through said top screen; and a small pieces fraction that passes through said top screen and does not pass through said bottom screen;

reintroducing said large pieces fraction into said shredding; and, processing said small pieces fraction in a secondary recovery process to recover an additional quantity of said one or more target materials that is bound to said small pieces fraction.

* * * * *